United States Patent [19]

Love

[11] Patent Number: 4,772,402
[45] Date of Patent: Sep. 20, 1988

[54] COOLANT PROCESSING SYSTEM

[76] Inventor: Ray B. Love, 823 Seymour, Jackson, Mich. 49202

[21] Appl. No.: 46,517

[22] Filed: May 6, 1987

[51] Int. Cl.$^4$ .................. B01D 25/00; B01D 27/00
[52] U.S. Cl. .................................. 210/804; 210/805;
 210/806; 210/807; 210/86; 210/98; 210/104;
 210/124; 210/195.1; 210/241; 210/244;
 210/258; 210/259; 210/265; 210/313; 210/314
[58] Field of Search .................. 210/767, 800, 532.1,
 210/803, 532.2, 804, 805, 806, 807, 86, 98, 103,
 104, 119, 121, 123, 124, 125–129, 194, 195.1,
 241, 242.1, 244, 252, 258, 259–262, 265, 282,
 295, 299, 305, 312, 313, 314, 316, 513, 521, 522

[56] References Cited

U.S. PATENT DOCUMENTS

| | | | |
|---|---|---|---|
| 3,897,335 | 7/1975 | Brandt | 210/776 |
| 4,361,488 | 11/1982 | White et al. | 210/799 |
| 4,519,904 | 5/1985 | Helmick | 210/173 |

Primary Examiner—Frank Sever
Attorney, Agent, or Firm—Beaman & Beaman

[57] ABSTRACT

A system for processing and reclaiming machine tool coolant wherein filtering apparatus mounted upon a portable frame is transported to the machine tool and includes pumps for cycling coolant from the machine tool coolant reservoir through coarse and fine filters to remove contaminating foreign matter, including bacteria. The apparatus includes an accumulating reservoir receiving and supplying pumped coolant and the pumps are controlled by float-operated switches maintaining a sequence of pump operation to assure efficient pump operation.

15 Claims, 2 Drawing Sheets

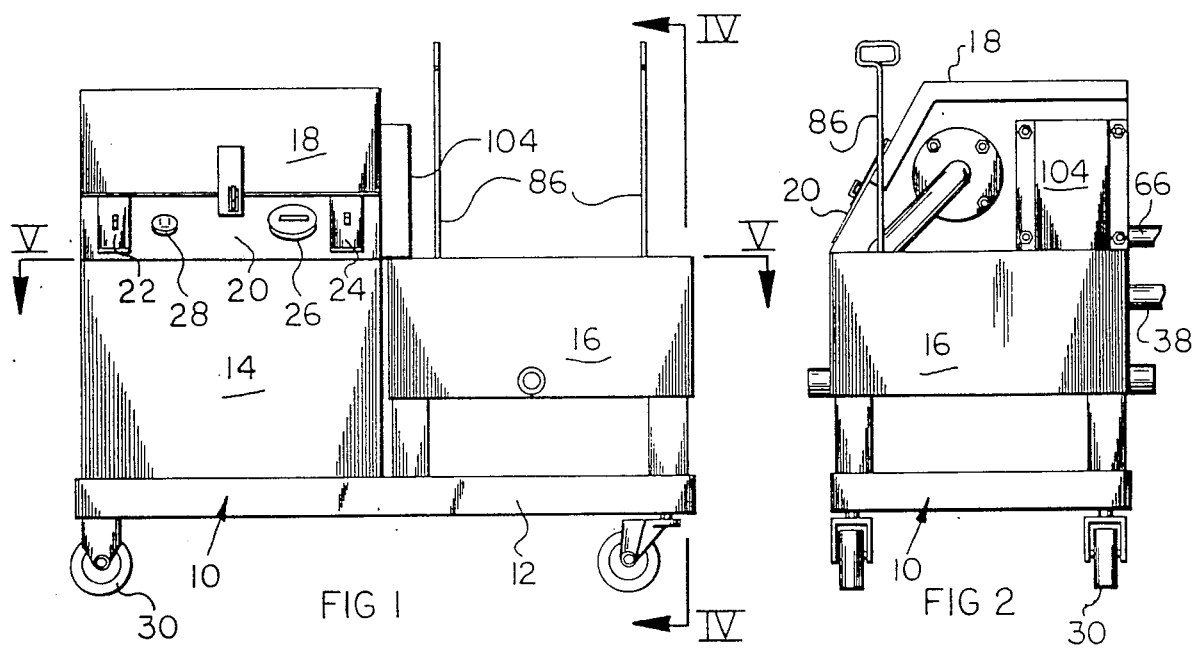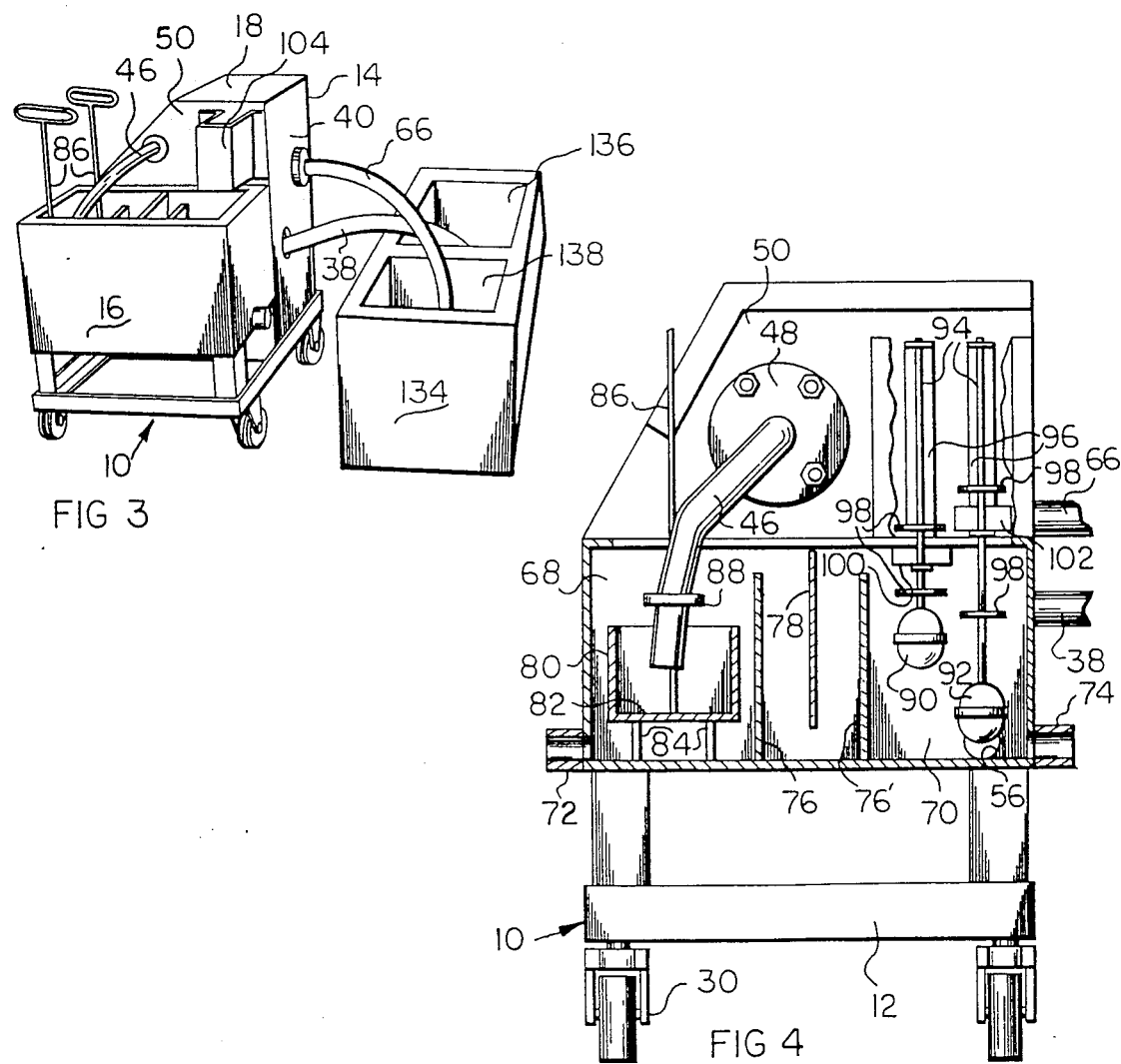

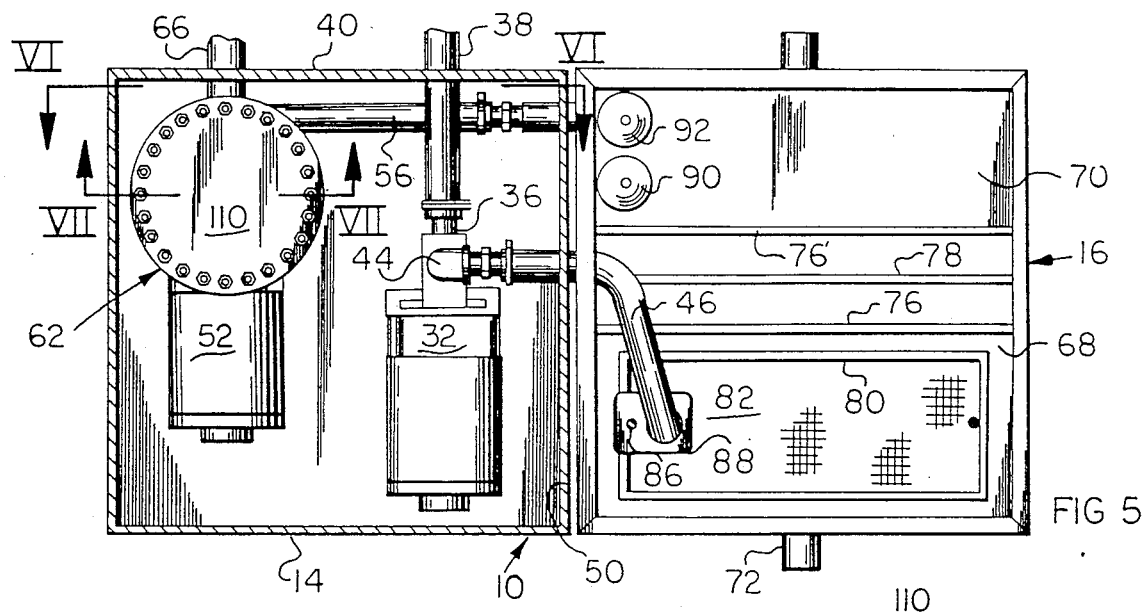
FIG 5
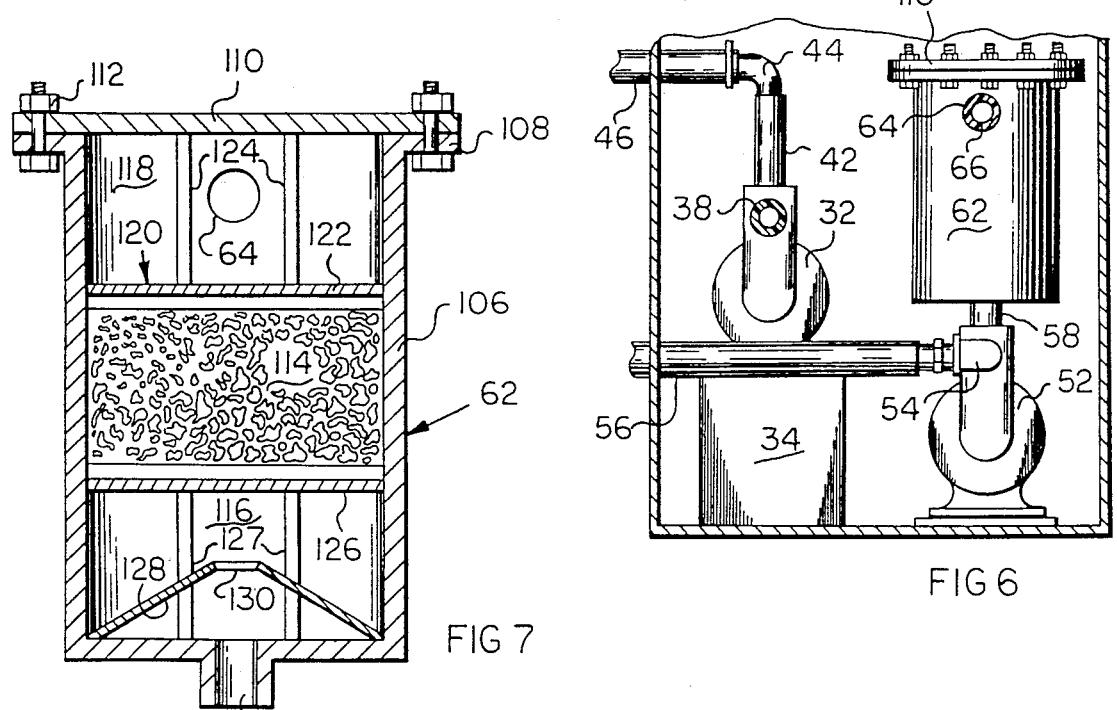
FIG 7
FIG 6
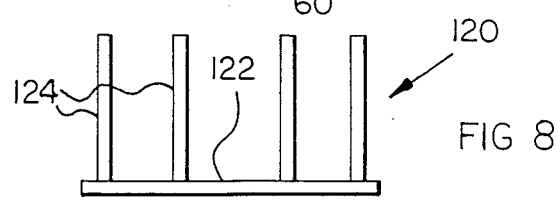
FIG 8
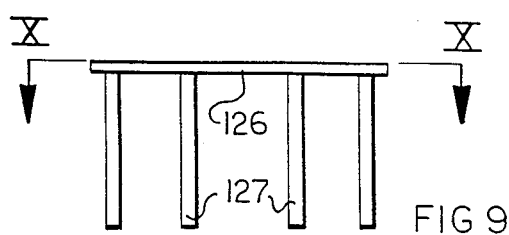
FIG 9
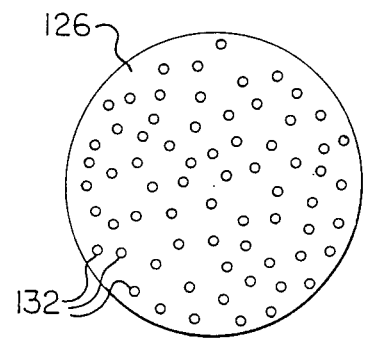
FIG 10

COOLANT PROCESSING SYSTEM

BACKGROUND OF THE INVENTION

Machine tools, such as milling machines, lathes, chucking machines, drill presses, automatic spindle machines, grinders, and the like commonly utilize a liquid coolant to cool the workpiece being machined. The coolant is usually directed at the point of contact between the tool and workpiece, and the machine tool coolant system normally consists of a pump being supplied from a sump or reservoir which pressurizes a conduit system for directing coolant flow to the location desired, and the discharged coolant returns to the sump or reservoir.

As the machining operations normally produce chips of various sizes, grit, and the like, the coolant contains various types of foreign matter which is continually recycled through the coolant system, and continued use of the coolant increases the contamination, while the coolant, which is usually a mixture of water and oils, serves as a breeding source for bacteria, all of which contaminates the coolant to the degree where it must be periodically replaced.

While the inclusion of small chips, grit and other foreign matter in the coolant adversely affects the quality of the machining operation, there is increasing concern over the health aspects of bacterial growth within the coolant in that the machine tool operator is exposed to the coolant.

Presently, as machine tool coolant becomes contaminated, either from the inclusion of foreign matter, bacterial growth, or both, the coolant is entirely discarded and replaced, which is expensive, or large stationary coolant processing equipment is used to process and reclaim the coolant. Such processing apparatus is very expensive, and available, for economic reasons, only to large users of machine tool coolant, and complex conduit and coolant handling systems are necessary when using such apparatus. Accordingly, small machine tool operations not having access to permanently installed coolant processing equipment must periodically discard the coolant and replace the same with fresh liquid.

It is an object of the invention to provide a coolant processing system for machine tools wherein the apparatus is relatively inexpensive, portable and may be readily utilized with a wide variety of machine tools to reclaim and renew the coolant.

A further object of the invention is to provide a coolant processing system utilizing portable apparatus including a plurality of pumps and filters wherein the coolant is removed from the machine tool coolant reservoir, pumped through a plurality of filters in a sequential manner to remove foreign matter and bacteria, and returned to the machine tool coolant system.

A further object of the invention is to provide an economical coolant processing and reclaiming system utilizing easily serviceable and maintained components and employing two pumps, one pump drawing contaminated coolant from the machine tool reservoir and pumping the coolant through a coarse filter into a reservoir mounted upon a portable frame, and the second pump removing the coarse filtered coolant from the frame-mounted reservoir and pumping the coolant through a fine filter and returning the twice-filtered coolant to the machine tool coolant system.

An additional object of the invention is to provide a coolant processing system employing two electric pump and filtering units connected in series wherein an accumulator reservoir receiving the discharge of one pump contains float-operated swtiches for controlling the pumps and controlling the pump and filter cycles.

In the practice of the invention a wheel-mounted frame supports first and second centrifugal pumps, and an accumulator reservoir is also mounted upon the frame. The first pump includes a suction conduit for drawing from the machine tool coolant system and the first pump discharges into a coarse filter located within the accumulator reservoir.

The suction conduit of the second pump communicates with the accumulator reservoir and the second pump discharge communicates with a fine particle filter for pumping the coarse filtered coolant therethrough to produce a fine filtered and processed coolant which is returned through a discharge conduit communicating with the fine filter.

Each of the pumps is controlled by an electric switch connected to a float sensing the liquid levels within the accumulator reservoir, and the electric switches control pump operation to prevent overfilling of the accumulator reservoir or emptying thereof. The fine filter preferably employs an activated charcoal element capable of removing very small particles, as well as bacteria, from the coolant, and filter element spacing and support means within the fine filter permit the filter element to be readily replaced and serviced.

The fine filter also includes flow control means upstream of the filter element for controlling the direction of fluid flow to provide optimum filtering and prevent channeling through the filter element.

The components utilized in the system of the invention are economically manufacturable or commercially available, and the practice of the invention permits efficient coolant processing and reclaiming at relatively low cost made available to the small machine shop operator.

BRIEF DESCRIPTION OF THE DRAWINGS

The aforementioned objects and advantages of the invention will be appreciated from the following description and accompanying drawings wherein:

FIG. 1 is a front elevational view of coolant processing apparatus in accord with the invention, FIG. 2 is a side elevational view as taken from the right side of FIG. 1, FIG. 3 is a perspective view of coolant processing apparatus in accord with the invention as operatively associated with the coolant reservoir of a machine tool, FIG. 4 is a side elevational, sectional view as taken along Section IV—IV of FIG. 1, FIG. 5 is a plan, sectional view as taken along Section V—V of FIG. 1, FIG. 6 is an elevational sectional view as taken along Section VI—VI of FIG. 5, FIG. 7 is a diametrical, elevational sectional view of the fine filter as taken along Section VII—VII of FIG. 5, FIG. 8 is an elevational view of the upper filter element positioning apparatus, FIG. 9 is a side elevational view of the lower filter element positioning apparatus, and FIG. 10 is a plan view as taken along Section X—X of FIG. 9.

DESCRIPTION OF THE PREFERRED EMBODIMENT

The apparatus of the invention includes a frame generally indicated at 10 defined at its lower region by a rectangular base 12 welded of angle iron. The frame includes a cabinet 14 in which the pumps and fine filter are located, as later described, and an open accumulator reservoir 16 of a rectangular configuration is mounted on the frame adjacent the cabinet. The cabinet includes a hinged cover 18 providing access to the cabinet interior. A control panel 20 is mounted upon the oblique front wall of the cabinet containing electric switches 22 and 24, an hour meter 26, and an electrical connector 28 to which a power source for the electric motors may be connected. The frame 10 is mounted upon casters 30 for ease of movement.

Internally, the cabinet includes a conventional electric centrifugal pump 32 such as a Model 2P390 made by the Teel Pump Company mounted upon a base 34 attached to the cabinet bottom. The pump includes an inlet 36 to which the flexible suction conduit 38 is attached. The suction conduit 38 extends through an opening in the cabinet rear wall 40, as will be appreciated from FIGS. 3 and 5.

The outlet of pump 32 communicates with upstanding conduit 42, elbow 44 and flexible conduit 46 which extends through an opening defined in plate 48 attached to the cabinet side wall 50. The conduit 46 extends into the accumulator reservoir 16, as later described.

The pump 52 is identical to pump 32 and includes an inlet 54 attached to the suction conduit 56. The suction conduit 56 extends through the cabinet side wall 50 for communication with the lower region of the accumulator reservoir 16 as will be appreciated from FIGS. 4 and 5.

The outlet of the pump 52 communicates with pipe conduit 58 attached to the lower port 60 of the fine filter generally indicated at 62, and the upper region of the fine filter includes an outlet port 64 to which the flexible discharge conduit 66 is attached and extends through an opening in the cabinet rear wall 40 for communication with the machine tool reservoir, as later described.

The accumulator reservoir 16 consists of a chamber 68 and a chamber 70, respectively drained by normally closed drain openings 72 and 74. The chambers 68 and 70 are separated by a a pair of parallel spaced weir plates 76 and 76' which have a vertical height of less than that of the reservoir 16, and a flotation screen plate 78 is located between the weir plate extending vertically above the top of the weir plates and terminating short of the bottom of the reservoir, wherein coolant within chamber 68 may flow over weir plate 76 under flotation screen plate 78 and over weir plate 76' into chamber 70.

A coarse filter basket 80 is mounted within accumulator reservoir chamber 68. The basket 80 is of a rectangular configuration, open at the top, and includes a bottom defined by a screen 82 having openings approximately 1/16" square. The basket is supported upon four legs 84, and a pair of lifting handles 86 extend upwardly from the basket ends to permit the basket to be removed from the reservoir 16. A conduit positioning bracket 88 is attached to one of the handles 86 and includes an opening through which the outer end of the conduit 46 may be inserted for insuring location of the lower outlet end of the conduit 46 within the basket and disposed toward the basket screen 82.

A pair of floats 90 and 92 are located within the accumulator reservoir chamber 70 for sensing the coolant level therein. Each of the floats includes a supporting column 94 slidably mounted within brackets 96 attached to the cabinet wall 50, wherein the float and associated column will rise and fall with the coolant level. Columns 94 include spaced switch-actuating plates 98 vertically adjustably mounted thereon, and a microswitch 100 located between the associated plates 98 is actuated by contact therewith and controls the operation of pump 32 while electric switch 102 located between its associated plates 98 controls the operation of pump 52. A protective shroud 104 attached to the cabinet wall 50 surrounds the upper portion of the columns 94 and brackets 96 to protect the float and switch structure.

The construction of the fine filter 62 is best appreciated from FIGS. 7-10. The filter includes a receptacle 106 of cylindrical configuration having a circumferential flange 108 wherein the upper end of the receptacle may be sealed by cover plate 110 and bolts 112. The filter element 114 is located intermediate the upper and lower regions of the receptacle defining an upstream chamber 116 and a downstream chamber 118.

Preferably, the filter element 114 consists of a cylindrical unit located within the flow passage through the fine filter filled with fine activated charcoal wherein all coolant passing through the fine filter is filtered by the element. The element 114 is maintained in position by an upper spacer 120 consisting of a perforated circular plate 122 and upstanding columns 124 attached to the plate which engage the underside of the cover plate 110. On the lower or upstream side of the filter element a similar perforated circular plate 126 engages the upstream side of the filter element supported upon columns 127 resting against the bottom of the filter receptacle.

A conical flow control baffle 128 is located within the chamber 116 as appreciated from FIG. 7. The baffle 128 is of a conical configuration having a periphery disposed adjacent the inner cylindrical wall of the filter receptacle and a central opening 130 is located at the baffle apex. Coolant entering the filter receptacle through inlet port 60 is located within the baffle and is discharged through the opening 130 toward the perforated plate 126 at its central region. The coolant flows through the perforations 132, FIG. 10, upwardly through the filter element 114 and through the perforations of the plate 122 into the upper chamber 118, and through the outlet port 64 and into the discharge conduit 66.

In operation, the apparatus is rolled upon its wheels 30 to be located adjacent the machine tool reservoir 134 containing the coolant to be processed. The reservoir 134 is typical of those commonly used with many types of machine tools and may consist of an open tank having chambers 136 and 138 usually interconnected by a weir, baffle, or the like. One of the chambers may contain pumping apparatus wherein machine tool coolant is received within one chamber and flows or is pumped to the other, and discharged therefrom through a coolant distribution system, not shown.

Upon positioning the coolant processing apparatus adjacent the machine tool reservoir 134 the flexible suction conduit 38 is placed in one of the reservoir chambers, such as 136, while the discharge conduit 66 is located within the other chamber, i.e. 138. For best results the inlet of the conduit 38 and the discharge of the conduit 66 should be located in spaced relationship to each other, and if the machine tool reservoir only consists of a single chamber the ends of the processing conduits should be located at opposite portions of the coolant reservoir.

The switches 22 and 24 are turned to the "on" position which will activate pump 32, as float 90 will close switch 100, to draw the contaminated machine tool coolant from chamber 136 into pump 32 and discharge the same into the filter basket 80. As the coolant flows into the basket 80 it will flow downwardly through the screen 82 and larger particles of chips and the like will be retained on the upper surface of the screen within the basket. As the reservoir chamber 68 fills with coolant, the liquid will flow over the top of the weir 76, under the plate 78 and over the top of weir 76' into accumulator reservoir chamber 70. Upon sufficient coolant being received within chamber 70, the float 92 will rise and the switch 102 will be turned to the "on" position and pump 52 will be energized.

Actuation of pump 52 will draw coolant from the reservoir chamber 70 through conduit 56 into the pump and discharge the same upwardly into the fine filter upstream chamber 116. The coolant will flow through the baffle opening 130 and through the filter element 114, fill the chamber 118 and be discharged therefrom through discharge conduit 66 into the machine tool reservoir chamber 138.

From the above description it will be appreciated that the coolant drawn into the pump 32 will be coarse filtered through the filter basket 80, the weir plates 76 and 76' and the flotation plate 78 will minimize the transfer of foreign matter to the reservoir chamber 70, and the pump 52 will force the coarse filtered coolant through the fine filter 114 for removing the very small particles of foreign matter and bacteria, before returning the coolant to the machine tool reservoir chamber 138. As the pumps 32 and 52 are under the control of their float-operated switches 100 and 102, respectively, the pumps will cycle on and off preventing overfilling of the accumulator reservoir, and preventing completely emptying the accumulator reservoir chamber 70 so as to prevent air from entering the pump 52.

The accumulator reservoir 16 and the use of the float control switches permits the apparatus to operate automatically and unattended, and the apparatus will be operated for a sufficient duration to recycle machine tool coolant from the reservoir 134 through the processing and reclaiming apparatus and filters to restore the coolant to a clean and substantially bacteria-free condition. Thereupon, the conduits 38 and 66 removed from the machine tool reservoir and the apparatus is moved to the next machine tool requiring servicing. As the basket 80 fills with the larger and coarser chips and particles, the basket may be readily removed from the reservoir chamber 68 by handles 86 and emptied. Likewise, upon the filter element 114 requiring replacement, the cabinet cover 18 is raised, the fine filter cover plate 110 removed, and removal of the filter element spacer 120 permits the filter element to be lifted from the receptacle 106 and a new filter element installed.

The apparatus of the invention is relatively concise in configuration, and as the components used are economical to fabricate and some may be purchased from conventional sources, apparatus of this type permits the efficient and economical servicing of smaller machine tool coolant systems, and the described apparatus achieves the objects and advantages of the inventive concepts.

It is appreciated that various modifications to the described embodiment of the invention may be apparent to those skilled in the art without departing from the spirit and scope thereof.

I claim:

1. A process comprising reclaiming machine tool coolant within a machine tool coolant circulation system wherein the machine tool coolant circulation system includes a reservoir by
    (a) pumping the coolant from the machine tool reservoir into a first filter,
    (b) filtering the larger foreign matter particles from the coolant to produce a coarse filtered first filtered coolant,
    (c) pumping said first filtered coolant through a second filter to produce a finely filtered second filtered coolant, and
    (d) discharging said second filtered coolant into the machine tool reservoir until the coolant within the reservoir attains an acceptable filtered condition.

2. In a process for reclaiming machine tool coolant as in claim 1 including the step of:
    (a) accumulating said first filtered coolant in a receptacle prior to pumping said first filtered coolant through the second filter.

3. In a process for reclaiming machine tool coolant as in claim 1, the second filter removing the majority of bacteria from said second filtered coolant.

4. Apparatus comprising: means for reclaiming machine tool coolant within a tool coolant circulation system, including, a frame, first and second electrically operated pumps mounted upon said frame, each of said pumps having an inlet and an outlet, a first conduit connected to said first pump inlet for receiving coolant from a machine tool, a second conduit connected to said first pump outlet, an accumulation reservoir defined on said frame, said second conduit discharging into said reservoir, control means for said first and second pumps mounted on said frame sensing the coolant level within said reservoir, a third conduit connected to said second pump inlet and in communication with said reservoir, a fine filter mounted on said frame having an inlet and an outlet, a fourth conduit connecting said second pump outlet with said filter inlet, and a fifth conduit connected to said filter outlet for returning filtered coolant to the machine tool.

5. Apparatus for reclaiming machine tool coolant as in claim 4, a coarse filter within said reservoir, said second conduit discharging into said coarse filter and said coarse filter discharging into said reservoir.

6. Apparatus for reclaiming machine tool coolant as in claim 5, said coarse filter comprising a basket located within said reservoir defined by bottom and side walls, and a screened opening defined in at least one of said walls in communication with said reservoir, said second conduit discharging into said basket.

7. Apparatus for reclaiming machine tool coolant as in claim 6, said reservoir comprising first and second chambers, a weir separating said chambers, said basket being located within said first chamber, said third conduit communicating with said second chamber.

8. Apparatus for reclaiming machine tool coolant as in claim 7, a flotation baffle interposed between said first and second chambers.

9. Apparatus for reclaiming machine tool coolant as in claim 4, a coarse filter mounted upon said frame having an inlet in communication with the discharge of said second conduit and an outlet in communication with said reservoir.

10. Apparatus for reclaiming machine tool coolant as in claim 4, said control means comprising a first float-operated switch mounted on said frame controlling operation of said first pump having a float within said reservoir, and a second float-operated switch mounted on said frame controlling operation of said second pump having a float within said reservoir.

11. Apparatus for reclaiming machine tool coolant as in claim 4, said fine filter comprising a receptacle having a flow passage defined therein, a filter element within said receptacle flow passage and having upstream and downstream sides, upstream and downstream chambers defined in said receptacles on opposite sides of said filter element adjacent corresponding filter element sides, said filter inlet being in communication with said upstream chamber and said filter outlet being in communication with said downstream chamber, and filter element positioning means located within said receptacle positioning said element therein.

12. Apparatus for reclaiming machine tool coolant as in claim 11, said filter element comprising activated charcoal.

13. Apparatus for reclaiming machine tool coolant as in claim 11, said filter element positioning means comprising perforated plates and spacer columns affixed to each plate, a plate engaging each element side.

14. Apparatus for reclaiming machine tool coolant as in claim 11, flow control means within said receptacle upstream chamber located between filter inlet and said filter element upstream side directing fluid toward said filter element.

15. Apparatus for reclaiming machine tool coolant as in claim 14, said flow control means comprising a conical deflector having a central opening and converging toward said filter element.

* * * * *